Patented Feb. 8, 1938

2,107,287

UNITED STATES PATENT OFFICE 2,107,287

LIQUID DEGREASING COMPOSITION

Alton F. Curran, Malden, Mass., assignor to The Curran Corporation, Malden, Mass., a corporation of Massachusetts No Drawing. Application January 10, 1936, Serial No. 58,535

5 Claims. (Cl. 87—5)

This invention relates to a liquid degreasing composition. The composition comprehended hereby is one designed and adapted for degreasing all kinds of surfaces fouled with greasy, waxy, or kindred substances whose removal with such agencies as are at present available presents considerable difficulty and expense.

An object of the present invention is to provide a liquid degreasing composition characterized by its ease of application to the surface to be degreased, its effectiveness in acting upon and conditioning greasy substances so that they may be instantly emulsified in water, and its capability of promoting their emulsification in water and together therewith being washed away without causing chemical attack on metal, paint, lacquer, wood, and other commonly experienced surfaces to be degreased. The composition of the present invention is thus eminently satisfactory for degreasing the engine or other parts of automobiles, aeroplanes, and other machines, oil tankers, various metals or metal parts more especially before an electro-plating operation, or other surfaces that become fouled with greasy substance as a result of manufacturing operations or use. Another object of the present invention is the preparation of such liquid degreasing composition from inexpensive ingredients by an economical process so that such composition can be profitably marketed at a price attractive for the various degreasing purposes mentioned.

Generally stated, the liquid degreasing composition of the present invention is of a substantially stable and physically homogeneous character and comprises saponified Tallol or Tallol soap, a suitable grease solvent, and alkali phenolate in amount sufficient to keep the soap in non-separating condition in the composition and to permit the composition to be associated or diluted with a comparatively large amount of grease solvent while retaining its substantial stability and physical homogeneity. It is evidently the case that when such a composition comes into contact with a grease-contaminated surface, the grease solvent penetrates the grease to flux it or render it sufficiently fluent so that it is conditioned for immediate emulsification in water, wherefore, when water is associated in generous quantity with the composition-conditioned greasy surface, as by causing a stream of water to impinge and play forcibly thereupon as delivered from a hose nozzle, the soap solution generated in situ on such surface and containing the Tallol soap as a highly effective emulsifying agent induces immediate emulsification and washing away of the grease from the surface. The alkali phenolate also assists an emulsification and washing away of the solvent-conditioned grease; and it also undergoes considerable hydrolysis in the presence of the water to liberate free alkali tending to saponify such saponifiable constituents as are present in the grease and thus to transform them to a water-soluble condition such that they are also readily washed or carried away by the water.

A composition embodying the present invention and suitable for the purposes hereinbefore indicated may contain various proportions of saponified Tallol, grease solvent, and alkali phenolate. While not limited thereto, a typical composition and its mode of preparation in accordance with the present invention will now be given. Saponifiable liquid known as Tallol and available on the market as a by-product from kraft pulp manufacture is added in desired amount to a mixing tank. The Tallol sold on the market may contain various proportions of rosin acids and fatty acids, but for the purpose of the present invention, I prefer to purchase a grade of Tallol containing about 50% to 70% of rosin acids, about 40% to 20% of fatty acids, and about 10% of inert or unsaponifiable organic substance probably of the nature of hydrocarbon. Not only can this particular grade of Tallol be procured at low price, but it is saponifiable to form a complex soap mixture of high grease-emulsifying potency. To the Tallol is then added a suitable saponifying agent in amount somewhat in excess of that theoretically necessary to saponify all saponifiable ingredients present in the Tallol. While various alkalies may be used as saponifying agents, caustic potash is preferable in that the resulting saponified Tallol or Tallol soap is of the desired extremely soft or gel-like consistency. Other alkalies such as ammonia or alkali equivalents or bases, such as triethylanolamine and other amines, may be used in lieu of caustic potash to produce the desired liquid or gel-like soap, but because these other alkalies or alkali equivalents are more expensive than caustic potash and present no particular advantage thereover for the purpose of the present invention, I consider them less desirable, excepting perhaps in special cases. It is also possible to replace by caustic soda up to about 50% of the caustic potash necessary for saponifying the Tallol and providing therein the desired excess or free alkali without developing undue stiffness in the saponified reaction product. The caustic alkali is preferably added to the Tallol as a concentrated solution, say, one of about 45% strength, in amount calculated to saponify the Tallol completely and to produce a reaction product containing a significant amount of free alkali, for instance, 1% to 5% or even more free alkali, based on the weight of the Tallol used as raw material. In order to avoid the formation of gobs of soap and/or the salting out of soap as it is being formed, the concentrated alkali solution is preferably added slowly and with intimate mixing of the ingredients. A good way of effecting intimate admixture between the reacting ingredients is to spray the concentrated alkali solution into the Tallol as the mixer of the tank is being operated to expose fresh Tallol surface to the saponifying action of the finely divided alkali solution being sprayed thereinto. The saponifying reaction goes readily to completion at about room temperature, say, 20° to 30° C., so that it is usually unnecessary to heat the reacting ingredients.

Once the soap-forming reaction has been completed, a suitable grease solvent may be added to the gel-like soap. Various liquid petroleum hydrocarbons have been found to be satisfactory as grease solvents, including light furnace oil of 32° to 34° Baumé known generally as "No. 2 Distillate". Oils, such as pine oil, may also serve as grease-solvents. Indeed, it may be advantageous to add to the saponified Tallol at least two different kinds of grease solvents, such as an admixture of equal proportions of light furnace oil and pine oil. Various amounts of grease solvent may be added to the saponified Tallol, but when, as is frequently desirable from the standpoint of economy, the composition is to be sold in concentrated form and is to be diluted by the user preparatory to use with grease solvent, such as light furnace oil or kerosene, it is preferable to add to the saponified Tallol only about 25% to 75% of its own weight of grease solvent, as such amount of solvent is all that is necessary to realize in the finished composition a fluidity fulfilling market requirements. In this connection, it might be observed that the grease solvent may to advantage serve in large measure as the agency by which appropriate fluidity is had in the finished composition.

The saponified Tallol admixed with grease solvent is an unstable composition in the respect that large particles of soap tend to separate out when such composition is permitted to stand. It is probably the case that the soap is unstably emulsified in the grease solvent and that the presence of excess alkali fosters the separation of the soap. A composition from which soap tends to separate is, of course, unsatisfactory for the use herein contemplated. I have found, however, that it is possible by the use of a comparatively small amount of phenol, preferably cresylic acid, to transform the unstable composition from which soap tends to separate to a substantially stable and physically homogeneous state partaking of the characteristics, so far as concerns stability and homogeneity, of a true solution. Comparatively little cresylic acid need be admixed for this purpose with the composition. Thus, the addition to the composition of only about 15% to 30% cresylic acid, based on the weight of a batch of composition prepared as previously described, ensures a finished composition of the desired stability and physical homogeneity. This amount of cresylic acid is more than is necessary to react with and consume the 1% to 5% of free alkali present in the composition to form alkali cresylate, which compound together with the excess cresylic acid evidently functions as a solvent for the saponified Tallol and the grease solvent in the sense that it renders them perfectly compatible. The resulting composition may, as already indicated, be diluted with a large amount of grease solvent, such as light furnace oil or kerosene, for instance, with as much as eight times its volume of such solvent without being impaired in its stability or homogeneity. Accordingly, the composition may be sold in concentrated form to the user and the user may effect such dilution preparatory to its use. When the composition in concentrated or diluted form is poured into water, the powerful emulsifying role of the saponified Tallol manifests itself, for the composition disperses instantaneously in the water to yield a milky emulsion without noticeable separation of free or floating grease solvent. To this property of instantaneous dispersability of the composition is ascribable the cleanliness with which the composition is washed away along with the grease of a grease-contaminated surface to which it is applied. All that need be done in applying the composition to a greasy surface to be degreased is to paint or spray it on the surface and allow it to penetrate the greasy contamination, whereupon the surface may be hosed off or otherwise washed clean with an abundance of water on account of the self-emulsifiability of the composition and the emulsifying action on the solvent-conditioned greasy contamination.

Should Tallol be unavailable at any time as raw material for the composition of the present invention, it is possible to use what might be termed a synthetic Tallol by admixing rosin and suitable liquid fatty acid, such as oleic acid, to approximate the composition of Tallol. Of course, liquid fatty acids derived from fish, corn, or castor oils, might be used in lieu of oleic acid. It is to be understood, therefore, that in using the term "Tallol" in the appended claims, I mean either the by-product available from kraft pulp manufacture or a product synthesized to approximate such by-product, even though from the standpoint of excellence of results and low cost it is distinctly preferable to employ such by-product whenever available.

An advantage of the process of the present invention is that it may be performed at room temperature so that no heat need be applied to the materials being processed, except possibly in the wintertime when it may be desirable to bring the raw materials to about 20° to 30° C. Again, the process lends itself to performance continuously with the proper kind of equipment, for instance, with a machine such as is described in Patent No. 1,792,067 issued February 10, 1931 to George A. Brown. Broadly speaking, the machine of that patent comprises a cylindrical mixing shell set up at an angle to permit liquid materials fed into its upper end to flow or gravitate to its lower discharge end as they are being intimately mixed therein and equipped with means by which liquid materials may be fed progressively in controlled amount into the upper end of the shell and also, if desired, into one or more lower portions of the shell. When such a machine is used for the purpose of the present invention, the Tallol and the concentrated alkali solution may be fed in predetermined relative proportions as separate streams into the upper end of the shell and the grease solvent and cresylic acid may be fed in appropriate amount as separate streams into successively lower portions of the shell. It is possible to add the grease solvent and cresylic acid together or to add either one or both of these ingredients along with the Tallol.

As already indicated, the proportions of the various ingredients used in preparing the composition of the present invention are subject to considerable variation, but, in any event, sufficient cresylic acid or equivalent phenol is used to react with such free or excess alkali as remains from the saponification of the Tallol and to render the Tallol soap and grease solvent compatible or non-separating in the finished composition. The alkali cresylate thus formed hydrolyzes to some extent in water to liberate free alkali; and if the greasy substance being removed by the composition contains saponifiable ingredient, the liberated alkali tends to react with such ingredient and thus to cause further hydrolysis of the alkali cresylate as the liberated alkali is being consumed by such ingredient. However, there is insufficient free alkalinity produced at any time as a result of hydrolysis in water of the alkali cresylate to injure sensibly metal, paint, lacquer, wood, or other surfaces to which the composition is applied, particularly as the composition once having been applied to the surface and allowed to penetrate and condition the greasy substance is instantly washed away with a generous supply of water, that is, is self-emulsifiable.

In lieu of cresylic acid, such as the ortho, meta, and para cresol, other phenols, such as carbolic acid, xylenol, alpha and beta naphthols, etc., might be used, but cresylic acid is preferable because of its low cost and the satisfactory results realized therewith. It is also possible to use chlorinated liquid hydrocarbons in lieu of liquid hydrocarbons as grease solvents. Accordingly, the expression "liquid hydrocarbon" used in the appended claims is intended to embrace also chlorinated liquid hydrocarbons, such as, trichlorethylene, carbon tetrachloride, orthodichlorobenzene, etc.

I claim:

1. A liquid degreasing composition of a substantially stable and physically homogeneous character comprising water-soluble "Tallol" soap, liquid hydrocarbon grease solvent, and alkali-metal phenolate, the liquid hydrocarbon grease solvent content of said composition ranging from about 25% to 75% of the weight of its "Tallol" soap content but said composition being capable of being diluted greatly with more of said liquid hydrocarbon grease solvent while retaining its substantial stability and physical homogeneity.

2. A liquid degreasing composition of a substantially stable and physically homogeneous character comprising water-soluble "Tallol" soap, liquid hydrocarbon grease solvent, and cresylic acid at least partly in the form of alkali-metal cresylate, the liquid hydrocarbon grease solvent content of said composition ranging from about about 25% to 75% of the weight of its "Tallol" soap content but said composition being capable of being diluted greatly with more of said liquid hydrocarbon grease solvent while retaining its substantial stability and physical homogeneity.

3. A liquid degreasing composition of a substantially stable and physically homogeneous character comprising potassium "Tallol" soap, liquid hydrocarbon grease solvent, and cresylic acid at least partly in the form of potassium cresylate, the liquid hydrocarbon grease solvent content of said composition ranging from about 25% to 75% of the weight of its potassium "Tallol" soap content but said composition being capable of being diluted greatly with more of said liquid hydrocarbon grease solvent while retaining its substantial stability and physical homogeneity and said composition being further capable of undergoing, upon admixture with water, immediate emulsification substantially without physical separation of said liquid hydrocarbon grease solvent.

4. A liquid degreasing composition of a substantially stable and physically homogeneous character comprising water-soluble "Tallol" soap, liquid hydrocarbon and grease solvent in the amount of about 25% to 75% of the weight of said soap, and cresylic acid in the amount of about 15% to 30% of the weight of both said soap and grease solvent, at least part of said cresylic acid being in the form of alkali-metal cresylate, said composition being capable of being diluted greatly with more of said grease solvent while retaining its substantial stability and physical homogeneity and said composition being further capable of undergoing, upon admixture with water, immediate emulsification substantially without physical separation of said grease solvent.

5. A liquid degreasing composition of a substantially stable and physically homogeneous character comprising potassium "Tallol" soap, liquid hydrocarbon grease solvent in the amount of about 25% to 75% of the weight of said soap, and cresylic acid in the amount of about 15% to 30% of the weight of both said soap and grease solvent, at least part of said cresylic acid being in the form of potassium cresylate, said composition being capable of being diluted greatly with more of said grease solvent while retaining its substantial stability and physical homogeneity and said composition being further capable of undergoing, upon admixture with water, immediate emulsification substantially without physical separation of said grease solvent.

ALTON F. CURRAN.